United States Patent [19]
Gerveshi et al.

[11] Patent Number: 5,790,072
[45] Date of Patent: Aug. 4, 1998

[54] METHOD AND APPARATUS FOR REDUCING DATA DELAY WITHIN A MULTI-CHANNEL SHARED-CIRCUIT DATE PROCESSING ENVIRONMENT

[75] Inventors: Christine Mary Gerveshi, Scotch Plains; Nathaniel Grier, Plainfield, both of N.J.; Taiho Koh, Seoul, Rep. of Korea

[73] Assignee: Lucent Technologies, Inc., Murray Hill, N.J.

[21] Appl. No.: 537,568

[22] Filed: Oct. 2, 1995

[51] Int. Cl.[6] .................................................. H04L 7/00
[52] U.S. Cl. ............................................. 341/141; 341/123
[58] Field of Search ..................................... 341/155, 141, 341/123; 364/724.1

[56] References Cited

U.S. PATENT DOCUMENTS

| | | | |
|---|---|---|---|
| 3,571,516 | 3/1971 | Ohyama et al. | 179/15 |
| 4,881,191 | 11/1989 | Morton | 364/724.1 |
| 5,262,970 | 11/1993 | Sevenhans et al. | 364/724.1 |
| 5,592,480 | 1/1997 | Carney et al. | 370/347 |

*Primary Examiner*—Jeffrey A. Gaffin
*Assistant Examiner*—Peguy Jeanpierre

[57] ABSTRACT

A multi-channel integrated circuit, which includes N processing channels and a functional circuit which is time-shared between each of the N channels for processing data in accordance with a first clock strobe. Also included is a time-division multiplexed bus for providing synchronized data to and receiving synchronized data from said circuit in accordance with a second clock strobe. The data are thereby processed within said shared circuit in synchronization with said first and second clock strobes.

17 Claims, 5 Drawing Sheets

METHOD AND APPARATUS FOR REDUCING DATA DELAY WITHIN A MULTI-CHANNEL SHARED-CIRCUIT DATE PROCESSING ENVIRONMENT

BACKGROUND OF THE INVENTION

1. Field of the Invention

The present invention relates to a method and apparatus for reducing group delay arising from the processing of data within a multi-channel, shared-circuit, data processing environment.

2. Description of the Related Art

Recently, considerable interest has developed in the design of multi-channel integrated circuits that include functional circuits which may be shared by the circuit's multiple channels. By integrating operation of a "shared" circuit with multiple channels (i.e., on a single chip or chip set), the integrated circuit's manufacturing cost may be reduced. More particularly, the fewer circuits required within an integrated circuit, the smaller and less complicated the design and the physical dimensions of the circuit can be.

Telecommunications systems, and in particular, digital voice transmission systems, frequently use coder/decoders (CODECs) to convert data between digital and analog form at each telephone subscriber's line. CODECs convert analog signals, e.g., voice signals, to pulse-code modulated (PCM) digital signals and digital PCM signals to analog. Evolving circuit technology first provided single CODEC integrated circuits (for use by a single channel) and then multiple channel integrated CODECs (Prior Art FIGS. 1 and 2). Thereafter, multiple channel integrated CODECs were developed in which certain generic functional circuits (generic to each channel's processing) were time-shared between each of the CODECs multiple channels (Prior Art FIG. 3). By integrating the processing with a single, shared functional circuit instead of N functional circuits, reduction in per-channel cost is realized because of the savings in space and effort required to manufacture the N-1 duplicated circuits within a conventional multi-channel device. Concomitantly, the implementation cost of a system within which the shared-circuit CODECs is reduced.

FIG. 1 is a block-diagram depiction of a portion of a conventional multi-channel integrated circuit that includes decimators 2, 4, 6, 8, for each of the circuit's four channels. Each of the decimators are strobed simultaneously with a decimator synchronizing signal to produce multiple contemporaneous outputs. These outputs are fed into the individual buffers 12, 14, 16, 18, which release the buffered data (onto the time division multiplexed bus) in accordance with timeslot synchronizing signals generated and delivered by the timeslot interchange 10.

FIG. 2 is a block diagram of another depiction of a conventional multi-channel circuit where each of the channels include decimators 32, 34, 36, 38, that are strobed independently by decimator synchronizing signals. The decimated data are output thereby at different times, according to the PCM bus definition for each channel. Such a design, however, still requires dedicated decimator circuits for each channel.

FIG. 3 depicts a portion of a prior art multiple channel CODEC that includes a decimator 40 shared by each of the CODEC's channels. Each channel's data are generally output from the time-shared decimator at an even rate, equally spaced in time, or in a burst with channel samples output one after the other followed by a dead time. Each channel's oversampled data are directed to a timeslot interchange (TSI) 10 to adjust the phase of the channel's data. The samples are passed through the TSI to arrange timing consistent with TDMB need, as described above with reference to FIG. 1.

While multi-channel, shared-circuit CODECs are attractive given their ability to time share at least one functional circuit, such as filtering and encoding, PCM data emerging from (or provided to) a shared circuit typically requires some sort of time or phase adjustment to accommodate system communication's parameters. To do so, the channel-specific data output from (or input to) the shared circuit is generally fed into a timeslot interchange. The timeslot interchange adjusts the data's phase for placement on a time division multiplexed bus (TDMB). A problem inherent within such multi-channel, shared circuit processing, however, is that a delay is introduced into each channel's data while it is phase-arranged to specific slots on the bus. A group delay develops as an accumulation of delays, limiting system performance.

For example, CODECs within each subscriber line of a modern digital system typically encode and decode PCM digital data at an 8 kHz rate within a given timeslot, depending on communication system parameters. Some systems use fixed assignments, while other systems assign timeslots dynamically as calls are placed. A problem with the conventional structure of a shared-circuit multi-channel CODEC is that it directs data to/from the shared circuit in particular time order, e.g., first-in-first-out. The processed data typically must be time arranged, leading to processing delay. The time-arranging or resorting, in its worst case, can impose up to a whole 8 kHz frame (i.e. 125 μsec) of additional delay to decimated/interpolated multi-channel data, influencing the distance that remote switching systems can be placed from a host switch.

SUMMARY OF THE INVENTION

The present invention substantially eliminates group delay inherent within frames of multi-channel data processed by a shared functional circuit within conventional multi-channel devices. The inherent group or frame-accumulated time delay results from an accumulation of individual channel delays arising from phase arranging each channel's data with transfer to/from the shared circuit. To avoid such delay, the apparatus according to the present invention provides structure, preferably in the form of an integrated circuit (IC), for processing each channel's data within the IC and outputting the processed data from the shared circuit in synchronization with the timing of a time division multiplexed bus (TDMB) to/from which the data are transferred. Processing in synchronization with bus requirements substantially avoids delay incurred in moving each channel's data onto or off the bus, and therefore, eliminate accumulated group delay. In other words, the "phase" of each channel's processing and data transfer is synchronized with the TDMB timeslot definition for each channel's data.

In a preferred form, the present invention provides a circuit and method for arranging data flow between multiple channels and a shared functional circuit within a multi-channel CODEC. Each channel's data is transferred to/from the shared circuit from/to a TDMB. The shared functional circuit preferably performs a decimator/interpolator function, whereby decimated channel data are output directly onto the time division multiplexed bus and data for decoding are provided from the bus directly onto the shared function.

DETAILED DESCRIPTION OF THE PREFERRED EMBODIMENTS

Figure 1:
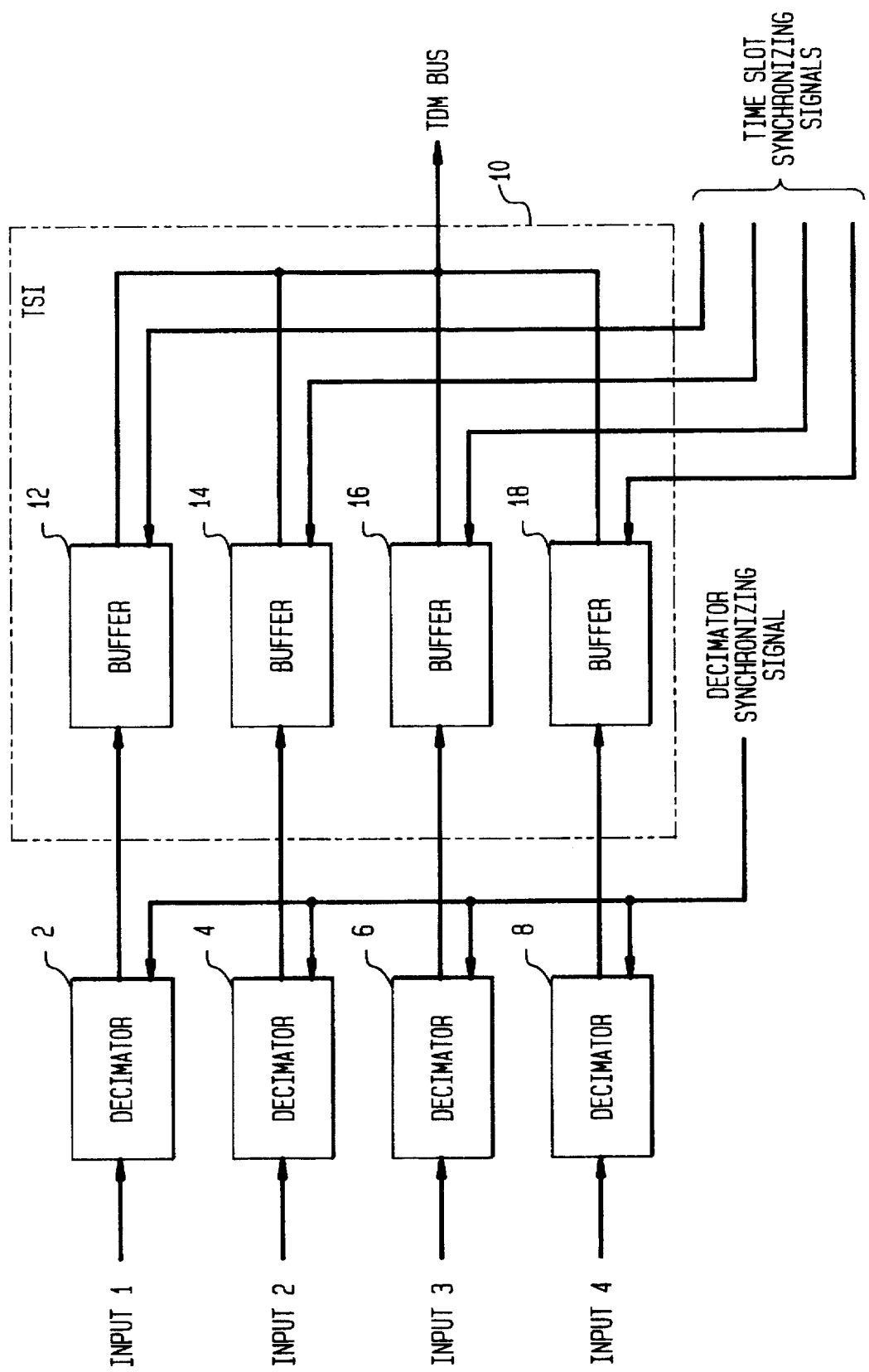
FIG. 1 is a schematic block diagram of a portion of a shared-function multi-channel circuit of the prior art.
Figure 2:
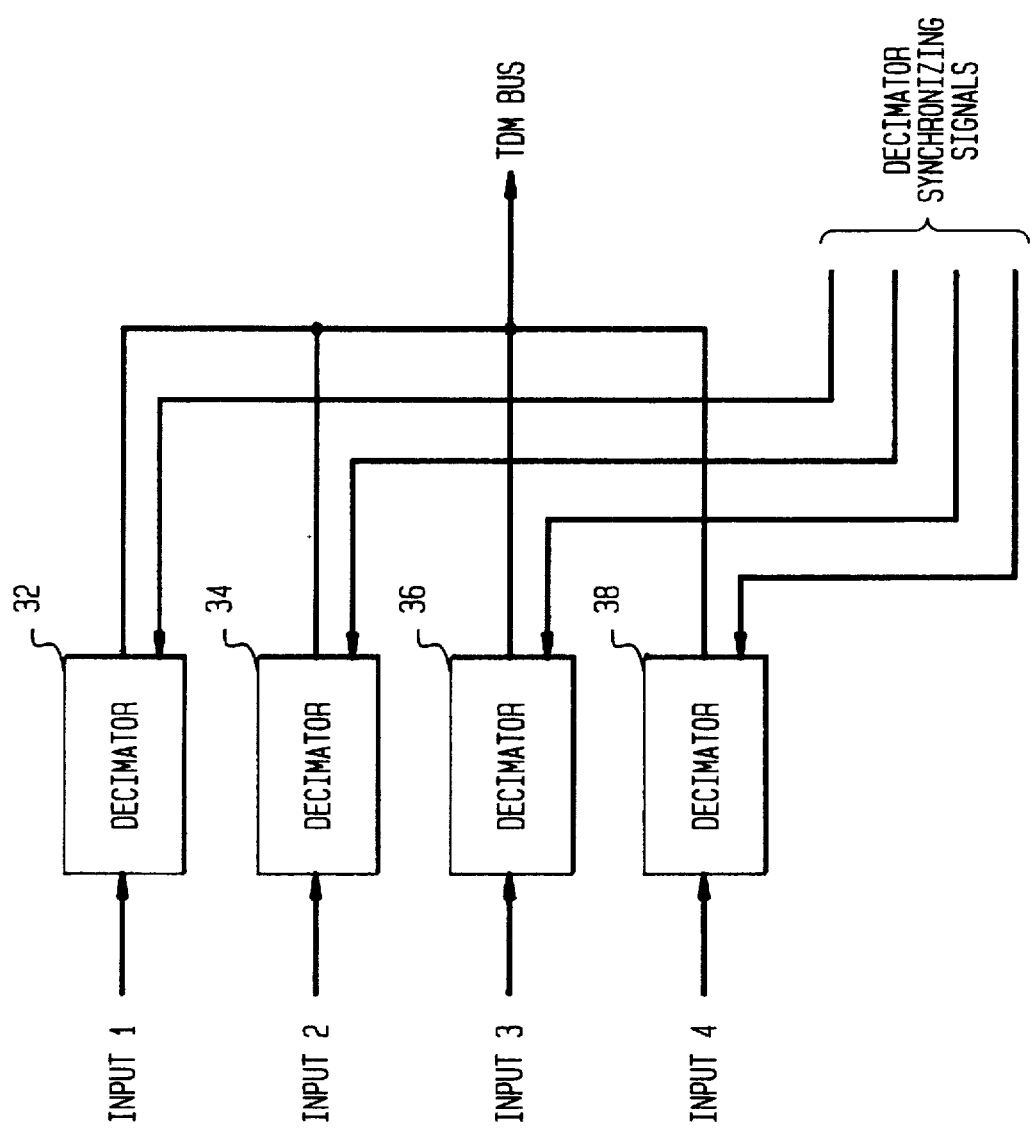
FIG. 2 is a prior art variation of the circuit of FIG. 1.

The present invention provides an integrated circuit that includes structure which enables the transfer of channel data to/from a shared functional circuit of a multi-channel device. Each channel's data are processed within the shared circuit in synchronization with the timing of a time division multiplexed bus (TDMB) which receives/provides each channel's data. This is in contrast to conventional shared functional circuit, multi-channel devices, where the data is not synchronized with the established timing on either side of the shared functional circuit.

The synchronization, or time-interlacing of the data processing is performed in an illustrative embodiment by structure that is provided at the juncture where digital data (channel-specific data) is directed from/to the shared circuit. In other words, the data is processed synchronously with the bus timing and provided directly to/from the shared circuit.

For purposes of illustration, the shared function according to the illustrative embodiment of the present invention is a decimation interpolator function. Operation of a decimator/ interpolator function utilized within a CODEC may be analogized to the operation of an analog clock, where the hour hand (major cycle) revolves with the minute hand. The minute hand completes an integral number of revolutions (minor cycles) for each single revolution of the hour hand. The decimator/interpolator has minor and major cycles as well. In the minor cycle, the decimator accesses the inputs at each of the several (i.e., N) channels, accepting a single sample from an oversampled ADC data stream output from each channel for processing. Within the major cycle, for example, the decimator may, after having processed 200 bits from a given channel, produce an output word to pass on to the TDMB. The 200 cycles may be analogized to a "200-minute" clock cycle, where each "200-minute" hour produces an output word corresponding to each shared channel. The output of a word (in our "200-minute" hour example) may occur, for example, sixteen thousand times per second.

To accomplish the above-described generalized decimation operation, three different clock strobes may be used. The fastest or maximum strobe drives the individual functions within the decimator. The frequency of the maximum strobe is on the order of the sample rate of the incoming data stream multiplied by the number of channels. For example, a 16 channel, 1 M sample/sec data rate stream requires a 16 Mhz strobe. The middle or medium clock strobe drives the phasing of the minor cycle. The minor cycle strobe synchronizes the readiness of each channel's data for input to the decimator for processing i.e., bits from the first channel, the second channel, etc. In other words, the middle or minor cycle strobe directs the decimator's attention to each channel as an output bit is ready to go. The minimum or lowest frequency clock strobe drives the phasing of the major cycle.

The minimum clock strobe tells the decimator when an output word is to be provided to the time division multiplexed bus. In other words, the minimum strobe synchronizes the collection of each data word from each channel with the appropriate bus timing.

Resetting each channel's state counter at the appropriate time provides synchronization of the channel's decimator output at the required time.

Figure 4:
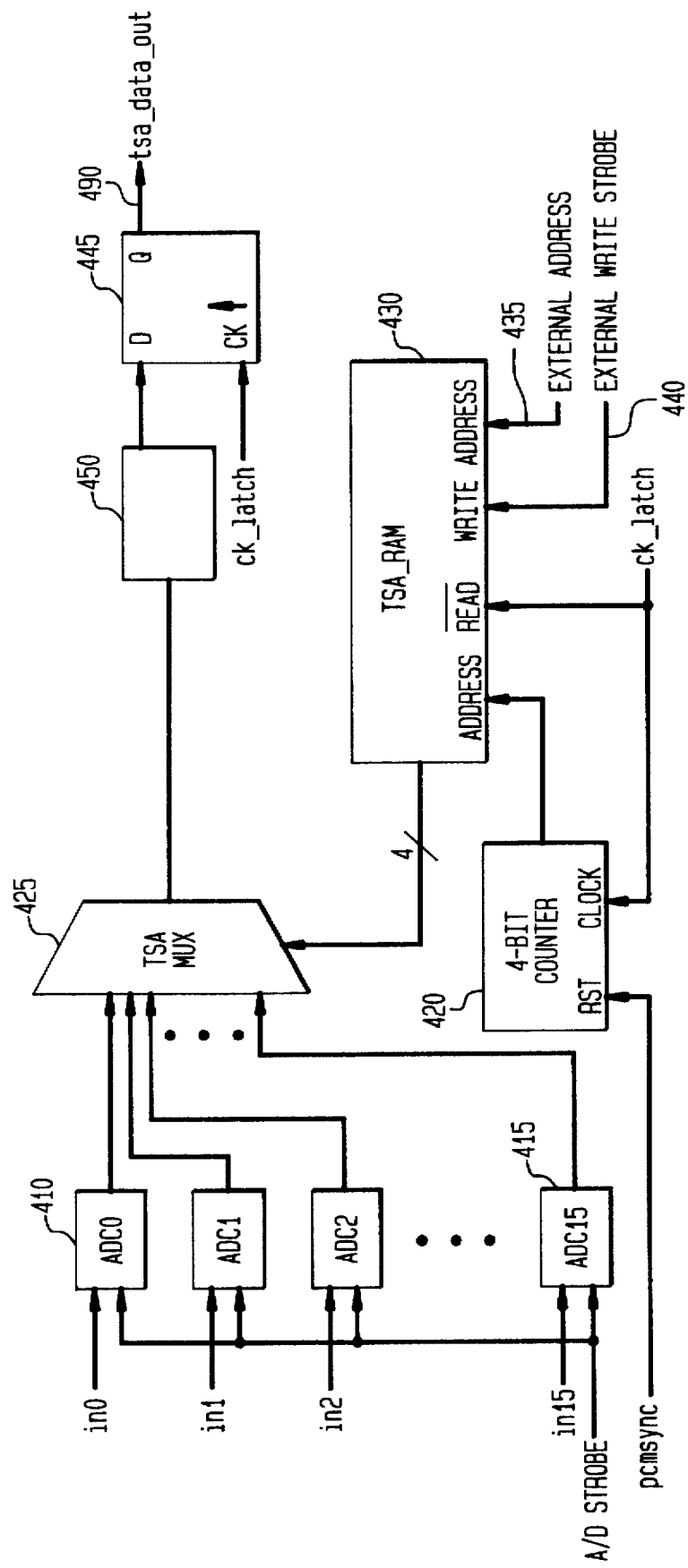
FIG. 4 is a block diagram of one embodiment of a shared-function, multi-channel circuit of the present invention.

An illustrative embodiment of the apparatus of the present invention is shown in FIG. 4. The multi-channel device depicted therein is a multi-channel CODEC which utilizes a shared device 450. For purposes of illustration, a decimator 450 is the shared device. It passes data between a number of oversampled analog-to-digital converters 410 to 415, which in turn receives inputs in0–in15. The oversampled converters (not shown) may use a very low resolution (e.g., 1 bit) to sample and encode analog signals at a very high sampling rate. The over-sampled data is decimated to reduce the effective number of samples of the outgoing PCM data (tsa-data-out). The decimated data are output directly onto the TDM bus 490. It can be seen that the shared-decimator function is output synchronously with the TDM reset or sync pulse (pcmsync) without buffering or delay.

Figure 5:
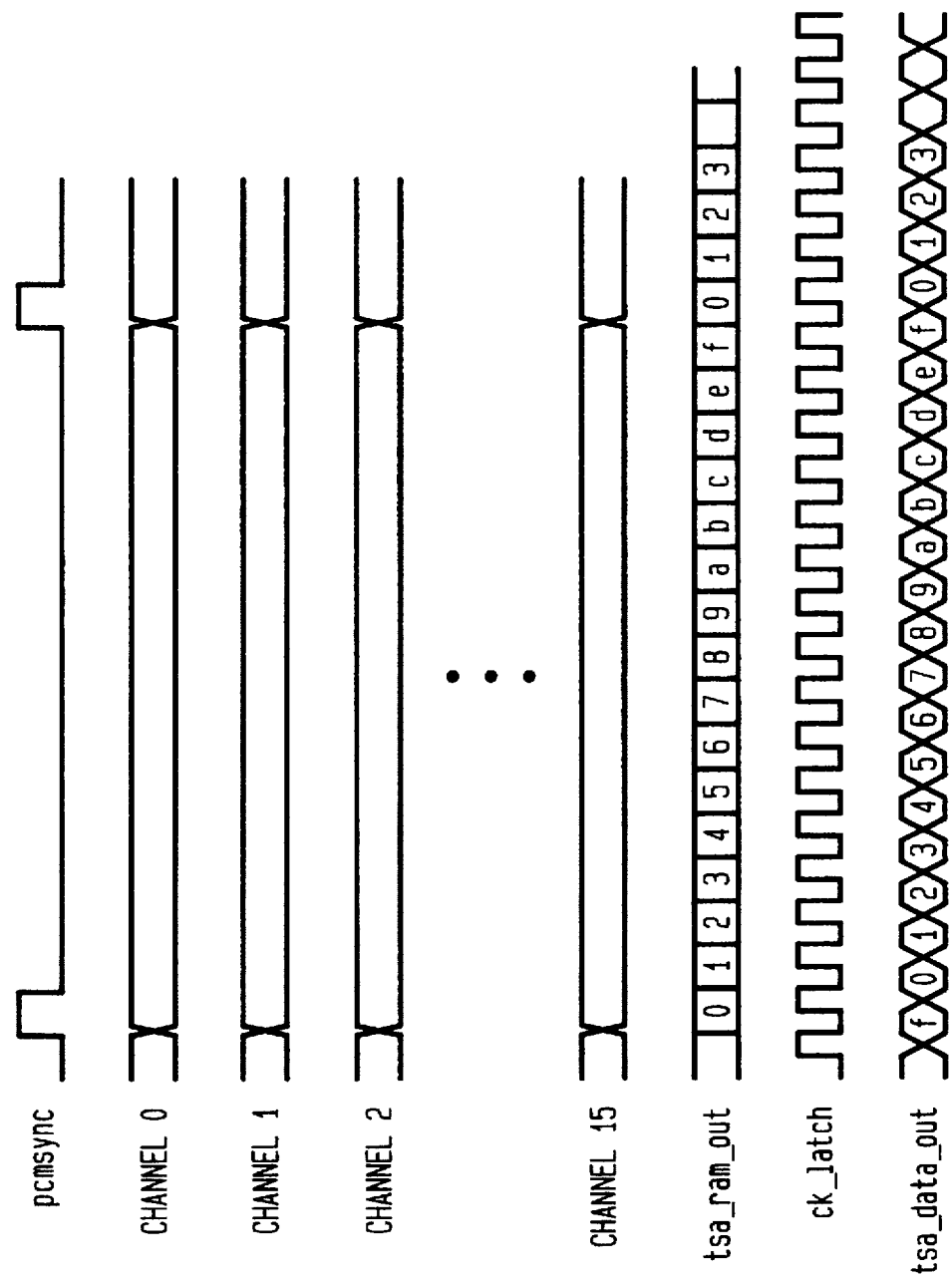
FIG. 5 is an illustrative timing diagram of the operation of the circuit of FIG. 4.

The operation of the illustrative embodiment of the invention as shown in FIG. 4 is more readily apparent when viewed in connection with the timing diagram of FIG. 5.

The TDM bus sync pulse (pcmsync) is the minimum or the slowest clock cycle. The sync pulse signals the start of a cycle to place the output data on the TDM bus and for the present illustrative embodiment, it runs at a 1 MHz rate. The pcmsync pulse is also used to reset or synchronize the data channels.

For the 16-channel data to output data from each channel within each TDM bus sync pulse, the channel data must be output at a speed of 16× the TDM bus data rate. Thus, the channel data clock (ck-latch) operates at around 16 Mhz. The ck-latch clock is divided by counter 420 to provide a 16 Mhz count, which is output to the address lines of the TSA RAM memory 430. The output from TSA RAM 430 is used to control the TSA MUX 425.

The TSA RAM 430 stores the channel-to-timeslot assignment data, which may be input or written from an external source via the external address 435 and external write strobe 440 lines. The order in which data is output from the TSA MUX 425 is controlled by the channel-to-timeslot assignment data stored in the TSA RAM. Thus, the channel to timeslot order assignment may be customized and externally controlled.

During operation, the counter 420 serves as a pointer to TSA RAM 430 to sequentially cause each assigned channel to be placed on the TDM bus 490 through latch 445. The data stream output onto the TDM bus 490 is shown in FIG. 5 in sequential channel/timeslot order. However, as explained above, the channel/timeslot output may be customized in any order depending upon the channel/timeslot data stored in the TSA RAM 430.

The sync pulse pcmsync resets the counter 420 to synchronize the above described data selection and processing.

Figure 3:
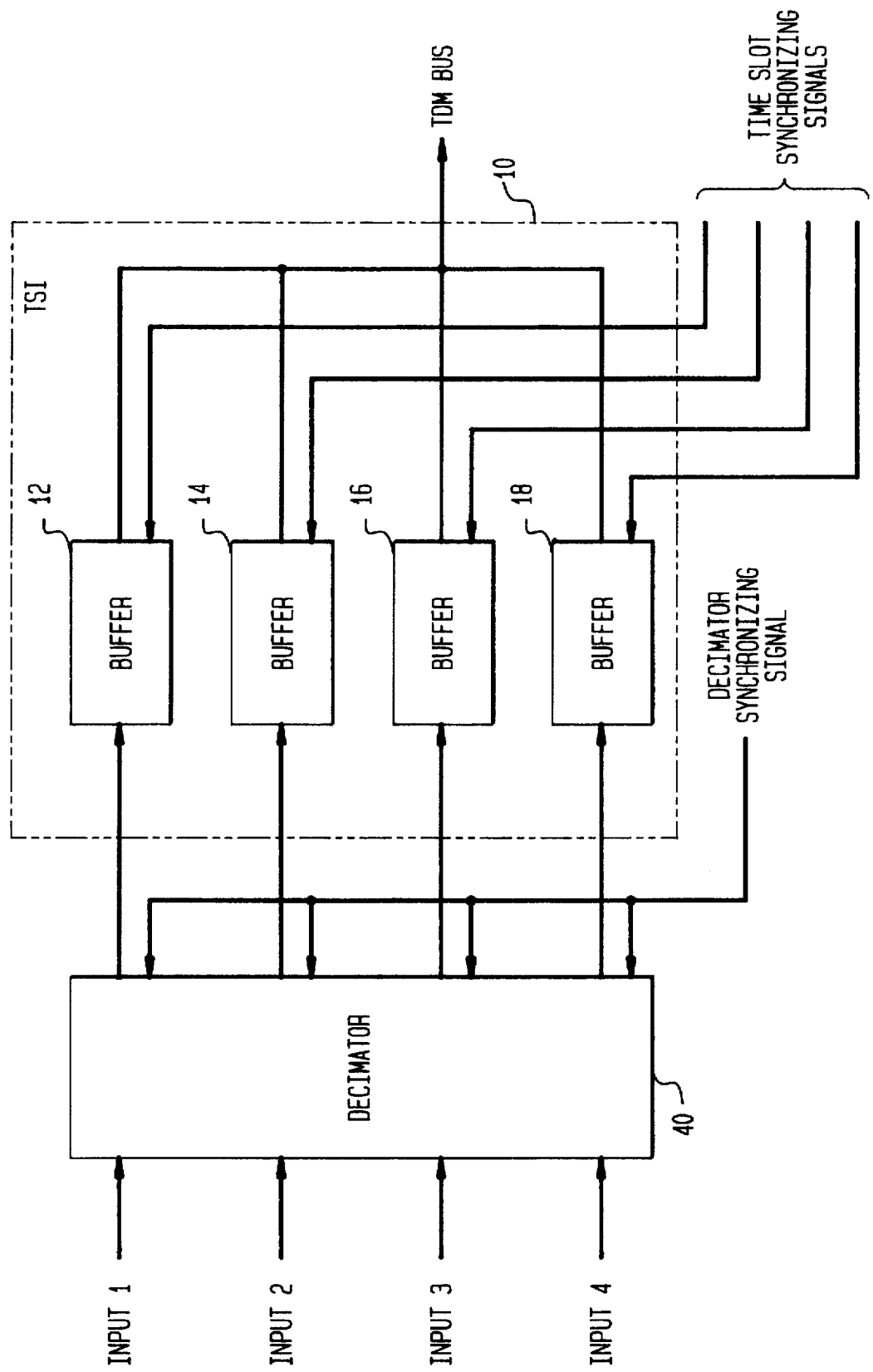
FIG. 3 is another prior art variation of the circuit of FIG. 1.

Conversely, analog signals may be reconstructed from digital data within each channel of the CODEC. The data are provided from the TDMB directly to the interpolation portion of the shared circuit without buffering or time delay. The data arrive at the interpolator and is processed in synchronization with the TDMB bus. This is in lieu of conventional methods, where data are held back (e.g., within buffers as in the prior art shown in FIG. 3) until the interpolator detects the "right" phase.

The present invention also envisions a method for processing data within a shared functional circuit of a multi-channel device in synchronization with predefined communications timing. In particular, the method of this invention envisions receiving and decimating oversampled bit stream data from each channel of a multi-channel CODEC. The decimated data from each channel are processed and output in a synchronized state with each channel's particular timeslot on a time division multiplexed bus. Conversely, data provided by the bus for interpolation (as part of a digital to analog conversion process) are transferred in synchronization with the timing needs of the destination and/or bus timing to the shared circuit, directly, for conversion to analog data signals.

In a preferred form, the present invention provides a circuit and method for arranging data flow between multiple channels and a shared functional circuit within a multi-channel CODEC. Each channel's data is transferred to/from the shared circuit from/to a TDMB. Thus, the Group delay typically incurred during multichannel, shared functional circuit CODEC processing is substantially eliminated. The shared functional circuit preferably performs a decimator/interpolator function, whereby decimated channel data are output directly onto the time division multiplexed bus and data for decoding are provided from the bus directly onto the shared function. However, in certain cases, it is desirable to add delay, as when equalizing transmit time over a transmission path. This may be accomplished by appropriate choice of timeslot position in the TSA RAM.

What has been described herein, such as a method for sharing a decimator/interpolator function whereby processed data is output in synchronization with systems timing, is merely illustrative of the application of the principles of the present invention. Other arrangements and methods may be implemented by those skilled in the art without departing from the spirit of this invention.

What is claimed is:

1. An integrated circuit having N inputs and an output for connecting to an output bus, said integrated circuit comprising:

N channels having N respective processing devices for processing said N inputs, each of said N inputs having a respective phase associated therewith;

a multiplexer for selectively multiplexing the processed N inputs onto a time-shared functional circuit;

a first clock pulse and a second clock pulse, said first clock pulse having a higher clocking rate then said second clock pulse;

a timeslot assignment device connected to said multiplexer for providing assignment data for assigning an order in which the processed N inputs are multiplexed onto said time-shared functional circuit, said timeslot assignment device being clocked by said first clock;

output means for outputting data from said shared functional device to said output bus, said data output by said output means having a phase associated therewith, said output means being clocked by said first clock for outputting up to N data between succeeding clocks of said second clock; and a synchronizer that synchronizes said first clock with said second clock thereby synchronizing the phase of each of said N inputs to said phase of said data output by said output means wherein said outputting of said functionally processed inputs onto said output bus is thus synchronized with the multiplexing of said processed N inputs onto said time-shared functional circuit in order to substantially avoid a delay.

2. The integrated circuit as in claim 1, wherein said timeslot assignment device includes a memory for storing said assignment data.

3. The integrated circuit as in claim 2, further including an external source for providing assignment data to said memory.

4. The integrated circuit as in claim 1, wherein said N respective processing devices are analog-to-digital converters.

5. The integrated circuit as in claim 1, wherein said time-shared functional circuit performs a decimation function upon outputs from said N channels.

6. The integrated circuit as in claim 2, wherein said means for synchronizing includes means for receiving both said first and second clocks for outputting data onto said output bus in fixed time relations to both said first and second clocks.

7. An integrated circuit for use in a digital switching system having multiple analog inputs and a digital output bus, said integrated circuit comprising:

a synchronizer that synchronizes said first clock with said second clock thereby synchronizing the phase of each of said N inputs to said phase of said data output by said output means wherein said outputting of said functionally processed inputs onto said output bus is thus synchronized with the multiplexing of said processed N inputs onto said time-shared functional circuit in order to substantially avoid a delay.

analog to digital converters for converting said analog inputs into respective digital data;

a functional device for performing a function upon each of said respective digital data for producing functional data representing said respective digital data and for outputting said functional data onto said digital output bus;

means for assigning said respective digital data onto said functional device by timeslot order; and a periodic clock signal and a periodic strobe signal external to the digital data, said strobe signal for signally said outputting of said functional data onto said digital output bus, and said clock signal for clocking said means for assigning at a higher frequency than said strobe signal whereby each of said respective digital data is assigned onto said functional device and in turn output onto said digital output bus between two consecutive strobes of said strobe signal.

8. The integrated circuit according to claim 7, further including means for synchronizing said clock signal to said strobe signal.

9. The integrated circuit according to claim 7, wherein said functional device performs a decimation function upon said respective digital data.

10. The integrated circuit according to claim 7, wherein said means for assigning includes a memory for storing timeslot assignment data which is accessed under timing control of said clock signal.

11. The integrated circuit according to claim 10, further including means for accessing said memory from a source external to said integrated circuit for writing said timeslot assignment data in said memory.

12. The integrated circuit according to claim 10, wherein said means for assigning includes a multiplexer for multiplexing said respective digital data onto said functional device under control by said timeslot assignment data output from said memory.

13. The integrated circuit according to claim 7, further including an outputting device connected to said functional device and driven by said clock signal for outputting said functional data onto said digital output bus in synchronism with said clock signal.

14. A method for processing N-channel data derived from a time division multiplexed bus within a shared circuit, said processing implemented in synchronization with a timing definition of said time division multiplexed bus such that group delay introduced into said data during processing within said shared circuit and output to each of said N channels has a desired value, said method comprising the steps of:

a) transferring data from said time division multiplexed bus into said shared circuit for processing;

b) processing said transferred data;

c) outputting said processed data onto each said N channels, wherein said steps of transferring, processing and outputting are carried out in synchronization with said timing definition; and d) initiating and repeating said timing definition by a periodic strobe signal external to said data and outputting said processed data onto each of said N channels within consecutive strobes of said strobe signal.

15. The method of claim 14, wherein said step of processing includes interpolating said data.

16. The method of claim 14, further including the step of selectively altering said timing definition.

17. The method of claim 14, wherein said desired value is minimized.

* * * * *